(12) United States Patent
Benabud

(10) Patent No.: US 10,194,641 B1
(45) Date of Patent: Feb. 5, 2019

(54) PET HARNESS DEVICES

(71) Applicant: Janan Benabud, Rabat (MA)

(72) Inventor: Janan Benabud, Rabat (MA)

( * ) Notice: Subject to any disclaimer, the term of this patent is extended or adjusted under 35 U.S.C. 154(b) by 0 days.

(21) Appl. No.: 16/053,742

(22) Filed: Aug. 2, 2018

Related U.S. Application Data

(60) Provisional application No. 62/540,509, filed on Aug. 2, 2017.

(51) Int. Cl.
*A01K 27/00* (2006.01)
*D07B 1/02* (2006.01)

(52) U.S. Cl.
CPC .......... *A01K 27/002* (2013.01); *A01K 27/003* (2013.01); *A01K 27/006* (2013.01); *D07B 1/02* (2013.01); *D07B 2201/1096* (2013.01); *D07B 2205/103* (2013.01); *D07B 2205/2067* (2013.01)

(58) Field of Classification Search
CPC .. A01K 27/002; A01K 27/003; A01K 13/001; A01K 15/04; A01K 1/04; A01K 27/001
See application file for complete search history.

(56) References Cited

U.S. PATENT DOCUMENTS

| | | | | |
|---|---|---|---|---|
| 3,769,939 A | * | 11/1973 | Wais | A01K 15/04 119/819 |
| 4,964,369 A | * | 10/1990 | Sporn | A01K 27/002 119/818 |
| 5,325,819 A | * | 7/1994 | Krauss | A01K 27/002 119/792 |
| 5,471,953 A | | 12/1995 | Sporn | |
| 5,713,308 A | * | 2/1998 | Holt, Jr. | A01K 27/002 119/792 |
| 5,743,216 A | * | 4/1998 | Holt, Jr. | A01K 27/002 119/793 |
| 5,934,224 A | | 8/1999 | Sporn | |
| 6,085,694 A | * | 7/2000 | Simon | A01K 27/002 119/792 |
| 6,167,844 B1 | * | 1/2001 | Cantrell | A01K 27/002 119/792 |
| 6,397,784 B1 | * | 6/2002 | Morgan-Albertson | A01K 27/002 119/792 |
| 6,401,666 B1 | * | 6/2002 | Kircher | A01K 27/002 119/792 |

(Continued)

*Primary Examiner* — Yvonne R Abbott-Lewis
(74) *Attorney, Agent, or Firm* — Integrity Patent Group, PLC; Charles E. Runyan

(57) ABSTRACT

A combined harness and leash device is disclosed. The device may comprise a one-piece buckleless pet harness, constructed from braided rope or other suitable material. Useful materials of construction may include natural or synthetic fibers and may include recycled fibers. The harness may consist of one continuous loop to prevent choking or strangulation. A slip assembly is used to create two adjustable loops that fit around a pet's front legs and wrap back through the slip assembly to form a leash or lead. When applying the harness, pet owners may enlarge one loop at a time in order to slip the pet's forelegs into place. Further, the harness may be ornamented with decorative gems, rhinestones, and other design elements for an enhanced look. The harness is offered in assorted colors as needed, as well as various sizes to suit different dog breeds.

20 Claims, 9 Drawing Sheets

(56) References Cited

U.S. PATENT DOCUMENTS

| | | | | |
|---|---|---|---|---|
| 8,100,090 B1* | 1/2012 | Sutter | ............... | A01K 27/003 |
| | | | | 119/792 |
| 8,950,364 B1* | 2/2015 | Wamsat | ............ | A01K 27/002 |
| | | | | 119/856 |
| 9,032,910 B2 | 5/2015 | Sandler | | |
| 9,271,476 B1 | 3/2016 | Flynn | | |
| 2011/0083616 A1* | 4/2011 | Elkins | ................ | A01K 1/04 |
| | | | | 119/792 |
| 2012/0234261 A1 | 9/2012 | Nelson | | |

* cited by examiner

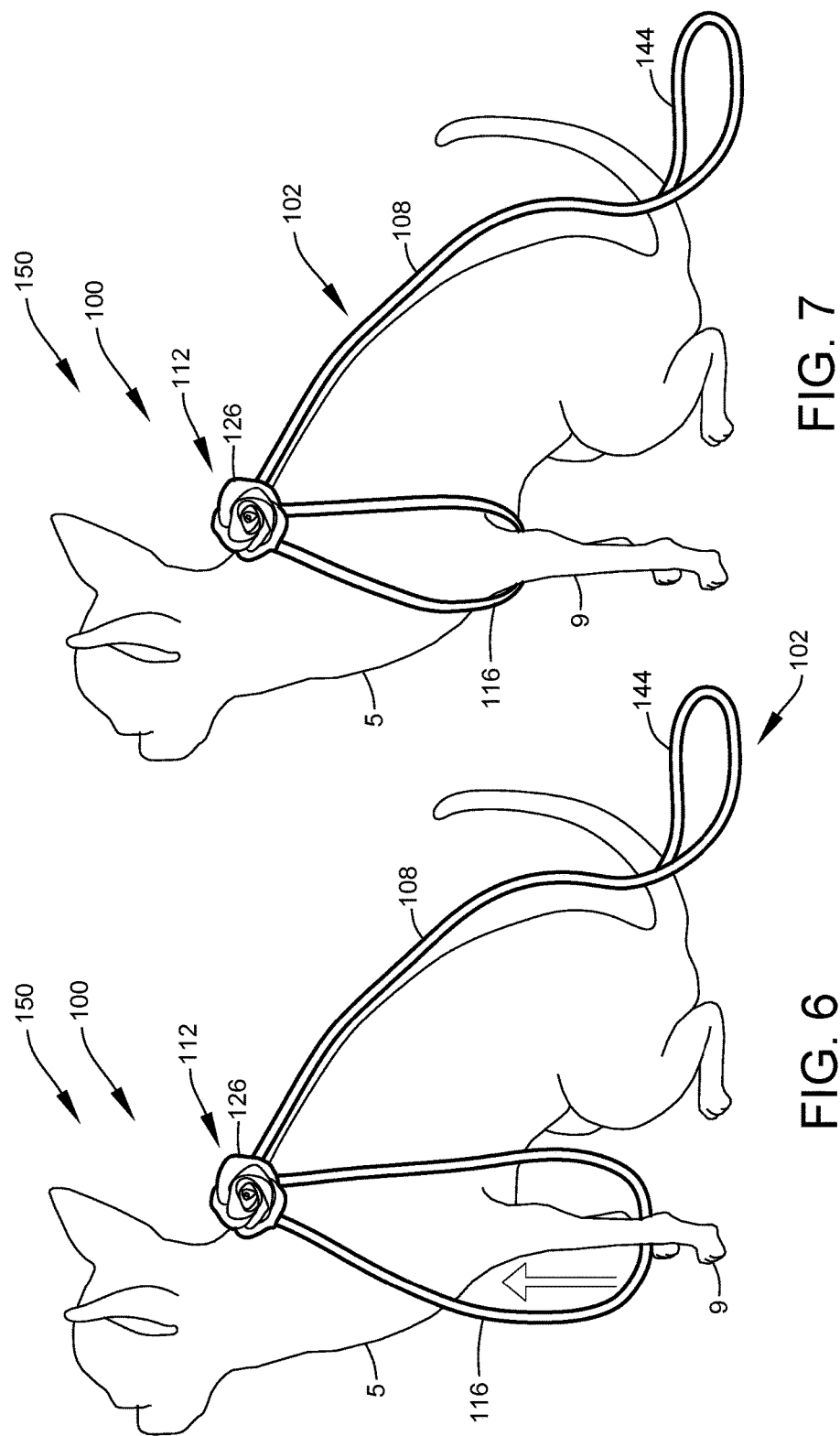

PET HARNESS DEVICES

CROSS REFERENCE TO RELATED APPLICATION

The present application is related to and claims priority to U.S. Provisional Patent Application No. 62/540,509 filed 2017 Aug. 2, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of tethers and animal securing means and more specifically relates to combined harness and leash devices for pets.

2. Description of Related Art

Many people that own dogs use a collar or harness and a leash to maintain control of their dog while walking with them. Most pet harnesses currently on the market have complicated straps, buckles, and similar closures that makes putting on the harness stressful and time consuming for both pet owners and pets. Additionally, searching around for a separate leash to attach to the harness is often an inconvenient task, as well as a nuisance when separate harnesses and leashes must be stored around the home. Furthermore, conventional harnesses and leashes are generally mundane and utilitarian in appearance. The development of a more convenient and attractive solution addressing these issues would benefit many.

Prior attempts have been made to overcome these issues. For example, U.S. Pat. No. 5,934,224 to Sporn relates to a leash-controllable dog harness formed by continuous loop. A leash-controllable, collarless dog harness adapted to inhibit a dog from straining against the leash. The harness is formed from a cable having a pair of branches which are joined together at their opposing ends to form a continuous loop with a coupling ring encircling one end. The other end of the branches extends through a buckle to create an eyelet through which the ring passes. Slidable along the branches to clamp them together is a lockable clamp, and also slidable thereon to space the branches apart is a spacer element. When the harness is installed, the clamp is then positioned to overlie the shoulder of the dog and the buckle is positioned to overlie the body of the dog, the spacer element then being placed adjacent the dog's chest, whereby the branches of the cable run from the ring through the eyelet to the clamp at the shoulder of the dog, and from there down opposite sides of the dog to pass through the left and right foreleg crotches and then up the body of the dog to terminate at the eyelet. Unfortunately, the operation of the Sporn device relies on overly-complicated arrangements of coupling rings, buckles, clamps, spacers, eyelets, etc.

BRIEF SUMMARY OF THE INVENTION

In view of the foregoing disadvantages inherent in the known tethers and animal securing means art, the present disclosure provides novel pet harness devices. The general purpose of the present disclosure, which will be described subsequently in greater detail, is to provide a combination leash and harness design that makes it easy and convenient to restrain pets. This innovative device may comprise a one-piece buckleless pet harness, constructed from long, thick, braided rope or other suitable material. The present system combines a pet harness and leash into a single convenient-to-use design. The device is made from one continuous loop of flexible cording for simplicity and ease of use. This eliminates the need for cumbersome buckles, clasps, clamps, or assembly hardware. The present system saves pet owners time, frustration, and worry.

Useful materials of construction may include natural or synthetic fibers and may include recycled fabric for an environmentally friendly appeal. The harness may have one continuous loop to prevent choking or strangulation. A knotted slip assembly is used to create two adjustable loops that fit around a pet's front legs and wrap back through the slip assembly to form a leash or lead. When applying the harness, pet owners may enlarge one loop at a time in order to slip the pet's forelegs into place. Further, the harness may be ornamented with decorative gems, rhinestones, and other design elements for an enhanced look. The harness can also be offered in assorted colors as desired, as well as various sizes to suit different dog breeds. The product can be worn by a dog who is already wearing a collar and identification tag. The exact specifications may vary upon manufacturing.

A combined harness and leash device is disclosed herein. The combined harness and leash device includes an elongated flexible member having a first end, a second end, and an intermediate portion extending between the first end and the second end; a harness portion formed within the intermediate portion, the harness portion including adjoining the first end, a harness guide member having at least one guide aperture configured to slidably receive the elongated flexible member, the harness guide member configured to be positionable above a back portion of the pet during use; a first foreleg loop configured to adjustably encircle a first foreleg of the pet, the first foreleg loop including a fixed first-loop segment joined to the harness guide member, and a movable first-loop segment slidably passing through the at least one guide aperture of the harness guide member, and a second foreleg loop configured to adjustably encircle a second foreleg of the pet, the second foreleg loop including a fixed second-loop segment joined to the harness guide member, and a movable second-loop segment joined with movable first-loop segment slidably passing through the at least one guide aperture of the harness guide member; and a leash portion formed within the intermediate portion, the leash portion joined with the harness guide member and extending outwardly to the second end.

A method of producing a combined harness and leash device is also disclosed. The method may comprise the steps of providing an elongated flexible member having a first end, a second end, and an intermediate portion extending between the first end and the second end; forming a harness portion within the intermediate portion, the harness portion including, adjoining the first end, a harness guide member having at least one guide aperture configured to slidably receive the elongated flexible member, the harness guide member configured to be positionable above a back portion of the pet during use; a first foreleg loop configured to adjustably encircle a first foreleg of the pet, the first foreleg loop including a fixed first-loop segment joined to the harness guide member, and a movable first-loop segment slidably passing through the at least one guide aperture of the harness guide member, and a second foreleg loop configured to adjustably encircle a second foreleg of the pet, the second foreleg loop including a fixed second-loop segment joined to the harness guide member, and a movable second-loop segment joined with movable first-loop segment slidably passing through the at least one guide aperture of the harness guide member; and forming a leash portion within the intermediate portion, the leash portion joined with the harness guide member and extending outwardly to the second end.

The method of producing a combined harness and leash device may further comprise the steps of applying at least one decorative element to the harness guide member; and forming a grippable hand loop within the leash portion, the grippable hand loop configured to assist hand gripping of the leash portion.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a range of pet harness devices, constructed and operative according to the teachings of the present disclosure.

FIG. 6 is a side perspective view illustrating an adjustment feature of the combined harness and leash device of FIG. 1, according to an embodiment of the present disclosure.

FIG. 7 is a second side perspective view further illustrating the adjustment features of the combined harness and leash device of FIG. 1, according to an embodiment of the present disclosure.

The various embodiments of the present invention will hereinafter be described in conjunction with the appended drawings, wherein like designations denote like elements.

DETAILED DESCRIPTION

As discussed above, embodiments of the present disclosure relate to tethers and animal securing means and more particularly to pet harness devices as used to improve the art of pet harnesses and leashes.

Generally, embodiments of the present disclosure provide a combined harness and leash for dogs. The harness has no buckles; rather, the device is designed to slip around the dog's forelegs. The harness and leash can be formed from a single piece of thick braided rope. The rope forming the device can be made of a wide range of sturdy and durable materials and may be supplied in a range of colors. The device may include a faux bijoux (costume-jewelry item) on the back of the harness. The leash and harness of the apparatus are attached together as one piece. The user can enlarge one leg hole (loop) at a time to allow the dog's front paws to be placed through a respective leg loop. When both legs are securely inside their loops, the harness is fully attached, with nothing else required to secure the device around the pet. The device has no buckles, is formed as one piece, and is easy to place on the pet.

Figure 1:
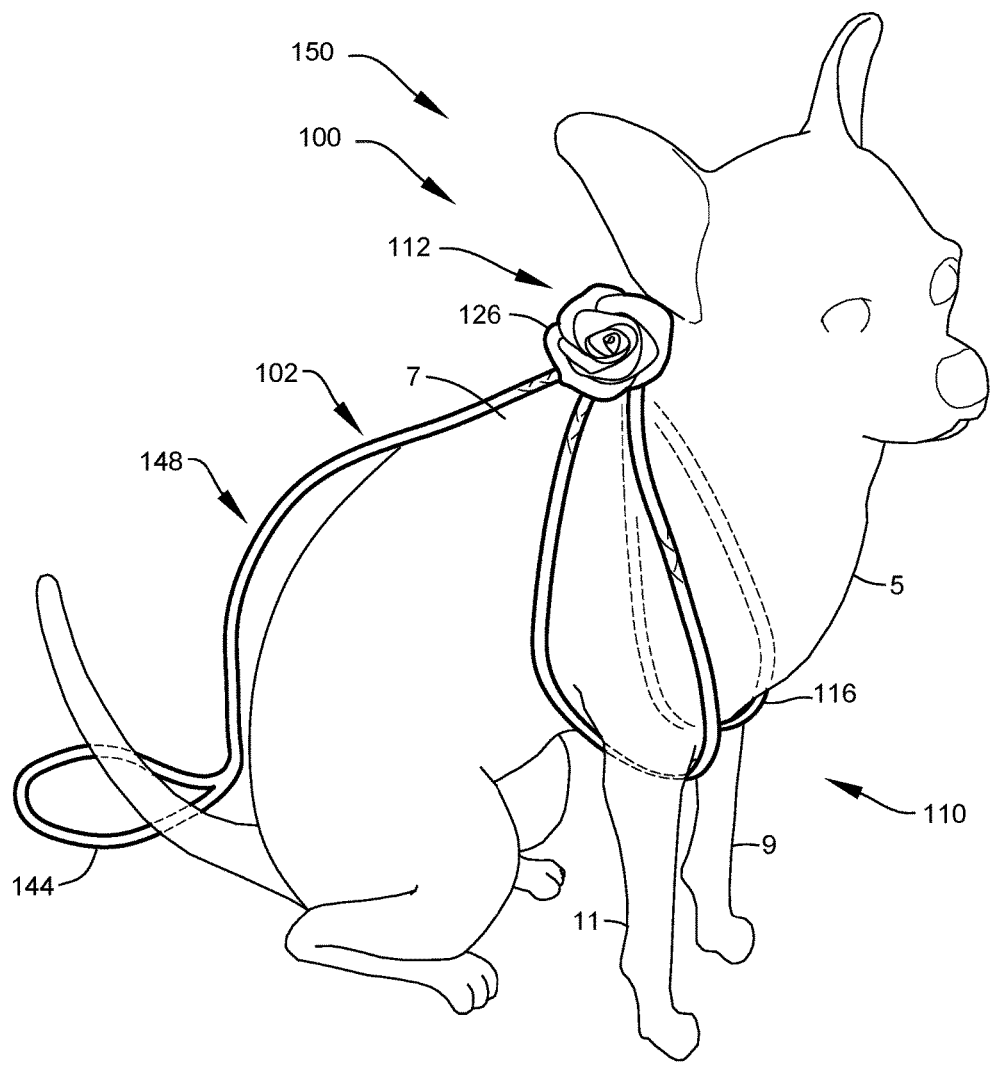
FIG. 1 is a front perspective view of the combined harness and leash device during an 'in-use' condition, according to an embodiment of the disclosure.
Figure 2:
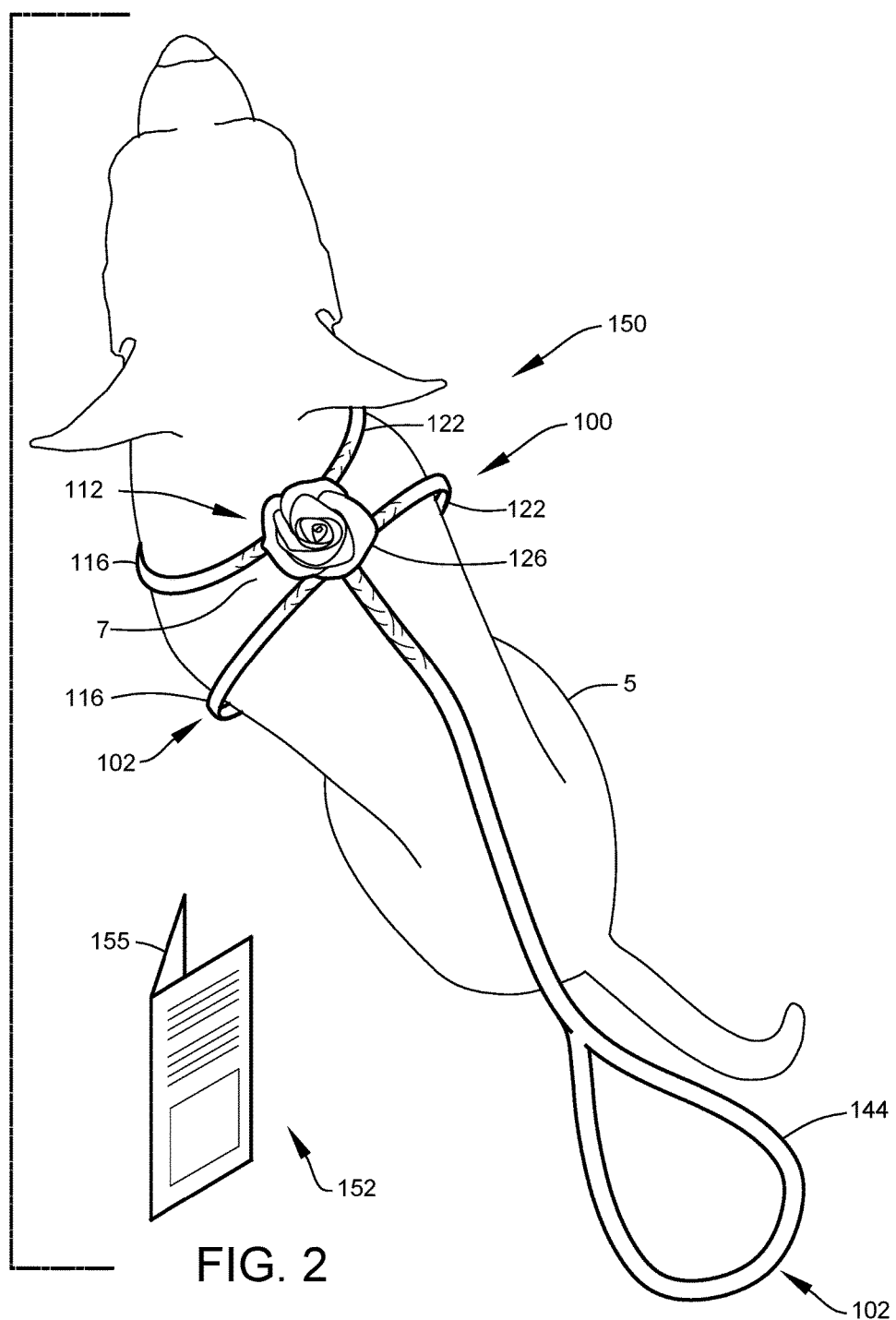
FIG. 2 is a top view of the combined harness and leash device of FIG. 1, according to an embodiment of the present disclosure.

Referring now more specifically to the drawings by numerals of reference, there is shown in FIGS. 1-12, various views of a combined harness and leash device 100. FIG. 1 shows a combined harness and leash device 100 during an 'in-use' condition 150, according to an embodiment of the present disclosure. FIG. 2 is a top view of the combined harness and leash device 100 of FIG. 1.

As noted above, embodiments of the present disclosure are structured and arranged to provide a combined harness and leash device for a pet 5. More specifically, the combined harness and leash device 100 provides both a harness and leash for small four-legged pets 5, including dogs and cats.

The device may comprise a one-piece buckleless harness, constructed from long, thick, braided rope or other suitable material. Useful materials of construction may include natural or synthetic fibers and may include recycled fibers. The harness may have one continuous loop to prevent choking or strangulation. A slip assembly is used to create two adjustable loops that fit around a pet's front legs (also referred to herein as forelegs) and wrap back through the slip assembly to form a leash or lead. When applying the harness, pet owners may enlarge one loop at a time in order to slip the pet's forelegs into place. Further, the harness may be ornamented with decorative design elements for an enhanced look. The applied decorative elements may be located on the back of the harness. The harness can also be offered in assorted colors as needed, as well as various sizes to suit different dog breeds. The product can be worn by a pet 5 who is already wearing a collar and identification tag.

Figure 3:
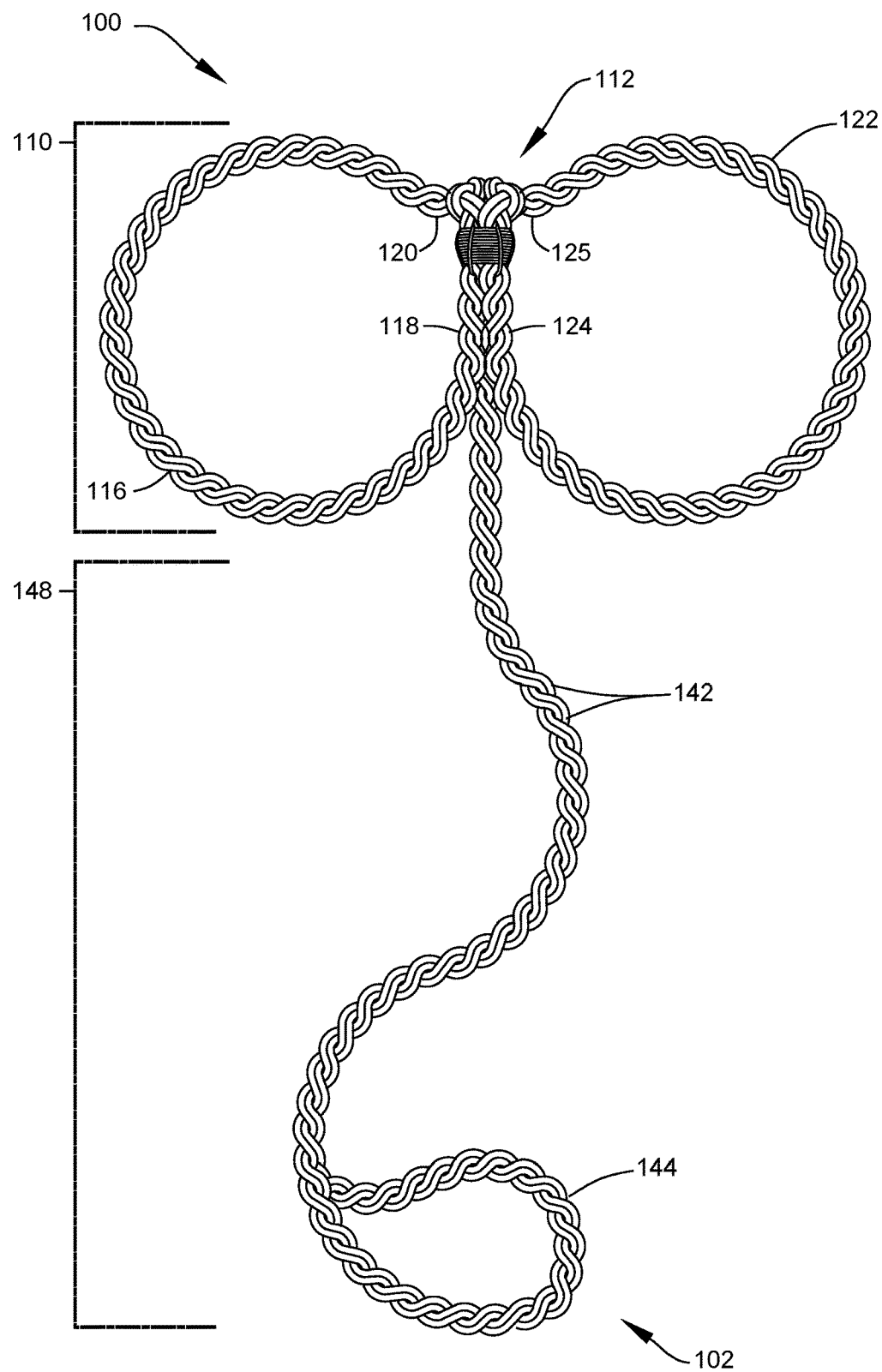
FIG. 3 is a top view of the combined harness and leash device of FIG. 1, removed from the pet, according to an embodiment of the present disclosure.
Figure 4:
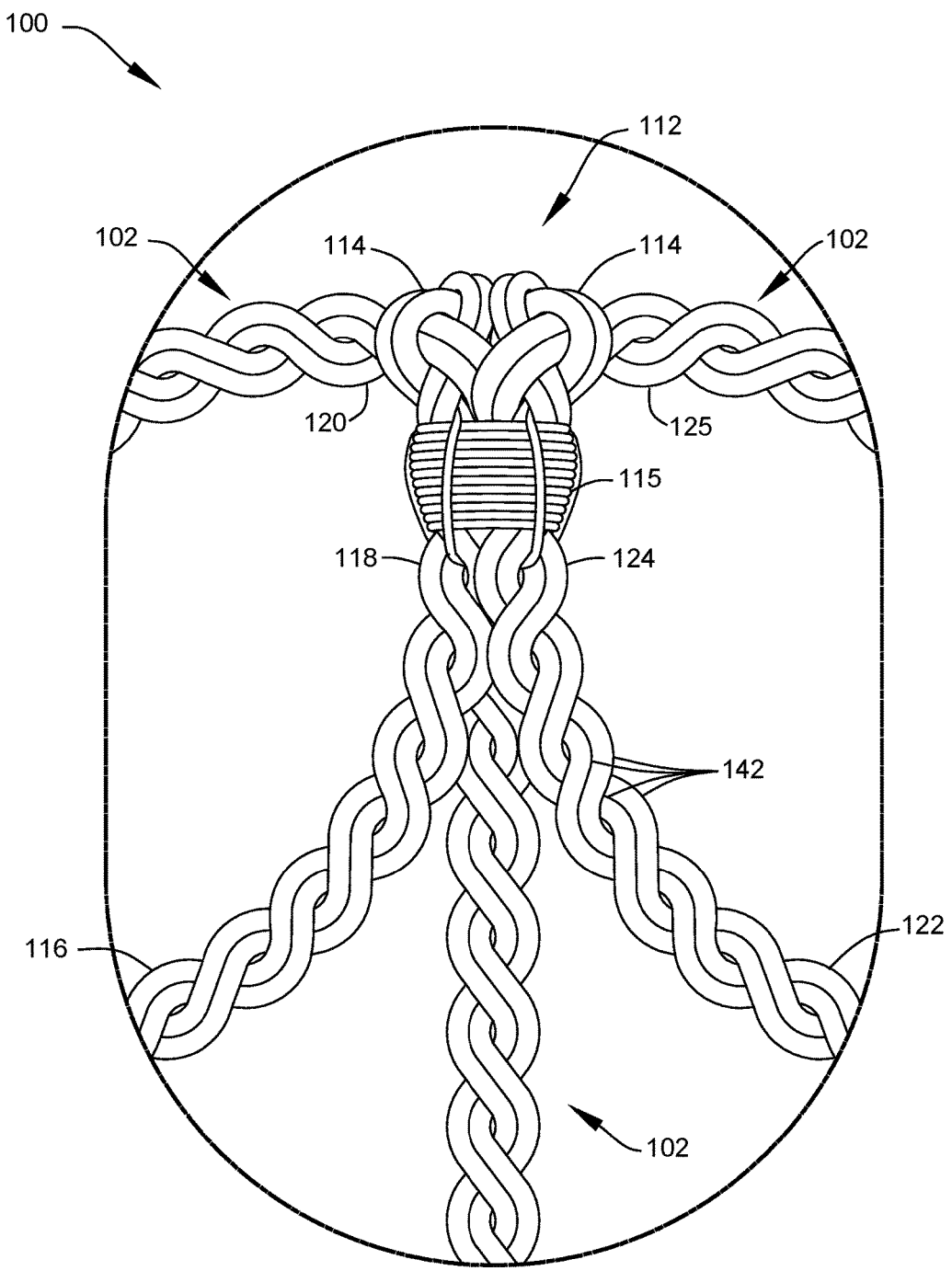
FIG. 4 is a detail view, enlarged for clarity, illustrating a harness guide member of the combined harness and leash device of FIG. 1, according to an embodiment of the present disclosure.

FIG. 3 is a top view of the combined harness and leash device 100 of FIG. 1. The combined harness and leash device 100 of FIG. 1 and FIG. 2 is shown with an applied decorative element 126. In the top view of FIG. 3, the applied decorative element 126 has been omitted from the view, thus allowing the underlying structures to be fully visible, for clarity of description. FIG. 4 is a detail view, enlarged for clarity, showing a harness guide member 112 of the combined harness and leash device 100 of FIG. 1, according to an embodiment of the present disclosure.

The combined harness and leash device 100 may be formed from an elongated flexible member 102, as shown. The elongated flexible member 102 may be constructed from a plurality of braided flexible cords 142, as shown. In the present disclosure, the terms cord and cording shall be generally defined as twisted fiber, intermediate between rope and string. It is further noted that terms cord and cording may include a wide range of a sizes and weights, which may include products labeled as rope and string. Upon reading this specification, it should be appreciated that, under appropriate circumstances, considering such issues as user preferences, design preference, structural requirements, marketing preferences, cost, available materials, etc., other elongated flexible materials such as, for example, elongated flexible members formed from single-strand molded or extruded polymers, interlocking chain assemblies, ribbons, etc., may be sufficient.

Figure 5:
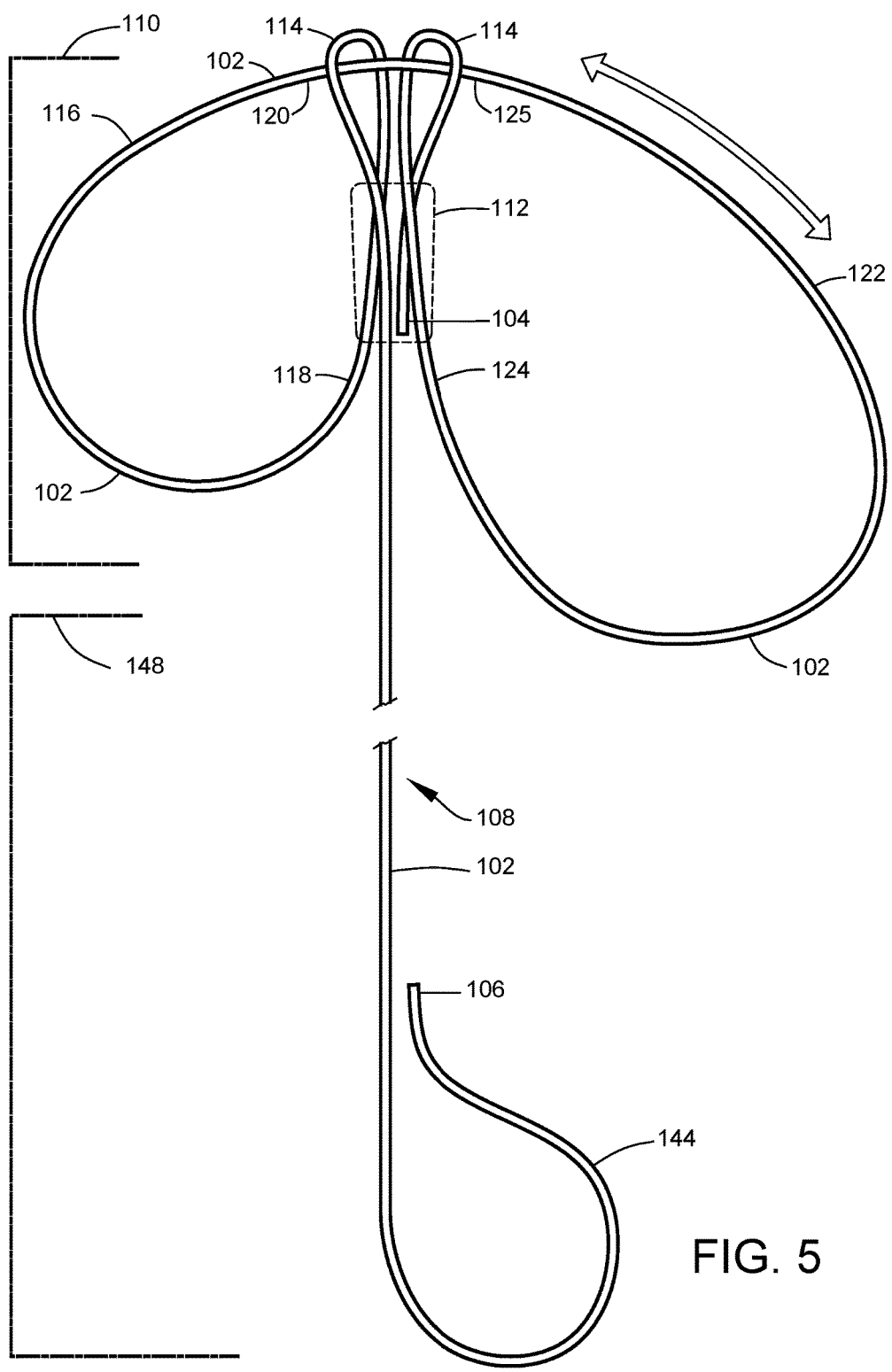
FIG. 5 is a diagram illustrating the looped arrangements of the combined harness and leash device of FIG. 1, according to an embodiment of the present disclosure.

FIG. 5 is a diagram illustrating the looped arrangements of the combined harness and leash device 100 of FIG. 1, according to an embodiment of the present disclosure. The location of the harness guide member 112 is indicated by the dashed-line depiction of FIG. 5. The applied decorative element 126 has again been omitted from the view, thus allowing the underlying structures to be fully visible.

As shown in FIG. 5, the combined harness and leash device 100 may be formed from a single, elongated flexible member 102 having a first end 104, a second end 106, and an intermediate portion 108 extending continuously between the first end 104 and the second end 106. The intermediate portion 108 may be arranged to form a harness portion 110 and a leash portion 148, as shown. The harness portion 110 may include the harness guide member 112 adjoining the first end 104, as indicated in FIG. 5 by the dashed-line depiction. The leash portion 148 may be joined with the harness guide member 112 and may extend outwardly to the second end 106, as shown. The leash portion 148 may include a grippable hand loop 144 configured to assist hand gripping of the leash portion 148. The grippable hand loop 144 may be formed by joining the second end 106 to a segment of the leash portion 148, as shown.

The harness guide member 112 may be formed by knotting the elongated flexible member 102, as shown in FIG. 4. More specifically, the harness guide member 112 may be formed by looping and knotting the elongated flexible member 102 to form at least one or two guide apertures 114, as shown. The knotted structure of the harness guide member 112 may be fixed by binding 115, sewing, bonding, etc. Each guide aperture 114 is configured to slidably receive the elongated flexible member 102, in some versions of the harness.

Referring again to FIG. 1 and FIG. 2, the harness guide member 112 may support one or more applied decorative elements 126. Both the harness guide member 112 and applied decorative elements 126 are designed to be positionable above a back portion 7 of the pet 5 during use, as shown.

FIG. 6 is a side perspective view illustrating an adjustment feature of the combined harness and leash device 100 of FIG. 1, according to an embodiment of the present disclosure. FIG. 7 is a second side perspective view further illustrating the adjustment features of the combined harness and leash device 100 of FIG. 1, according to an embodiment of the present disclosure. In reference to FIG. 1 through FIG. 7, the harness portion 110 may include a first foreleg loop 116 configured to adjustably encircle the left foreleg (hereinafter identified herein as the first foreleg 9) of the pet 5. The first foreleg loop 116 may include a fixed first-loop segment 118 joined to the harness guide member 112, and a movable first-loop segment 120 slidably passing through the guide aperture 114 of the harness guide member 112, as best shown in FIG. 5.

The harness portion 110 may include a second foreleg loop 122 configured to adjustably encircle the right foreleg (hereinafter identified as the second foreleg 11) of the pet 5. The second foreleg loop 122 may include a fixed second-loop segment 124 joined to the harness guide member 112, and a movable second-loop segment 125 joined with movable first-loop segment 120 slidably passing through the guide aperture 114 of the harness guide member 112, as shown.

The first foreleg loop 116 is selectively size adjustable by slidably extending and slidably retracting the movable first-loop segment 120 through the guide apertures 114 of the harness guide member 112. Additionally, the second foreleg loop 122 may be configured to be selectively size adjustable by slidably extending and slidably retracting the movable second-loop segment 125 through the guide apertures 114 of the harness guide member 112, as generally illustrated in FIG. 5 by the arrow depiction. It is noted that the first foreleg loop 116 and the second foreleg loop 122 are conveniently configured to be concurrently size adjustable by slidably extending and slidably retracting either one of the movable first-loop segment 120 and the movable second-loop segment 125 through the guide apertures 114 of the harness guide member 112.

When applying the harness, a user may enlarge one loop at a time in order to slip the pet's forelegs into place. The user may place the device on the pet by selectively enlarging one of the foreleg loops, slipping the loop about a respective foreleg of the pet, followed by tightening of the loop about the foreleg and torso, as generally illustrated in FIG. 6. Tightening of the loop encircling the selected foreleg concurrently enlarges the opposite foreleg loop, which allows the other foreleg to be placed though the remaining loop. Both loops may then be adjusted to comfortably position the harness portion 110 about the forelegs and torso of the pet 5, as illustrated in FIG. 7. The harness guide member 112 may be configured to adjustably retain the elongated flexible member 102 at a selected position by frictional engagement of the elongated flexible member 102 with the guide aperture 114.

Figure 8:
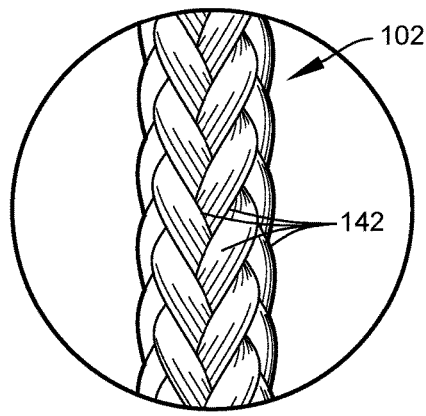
FIG. 8 is a detail view, enlarged for clarity, showing a braided arrangement of flexible cords used to form the combined harness and leash device of FIG. 1, according to an embodiment of the present disclosure.
Figure 9:
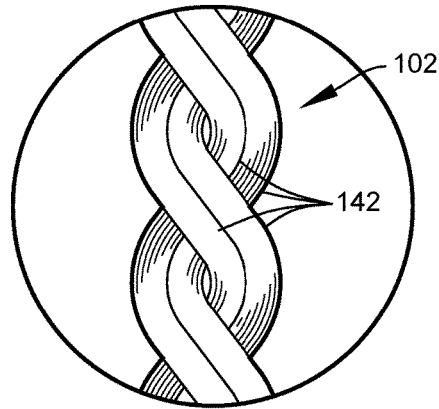
FIG. 9 is a detail view, enlarged for clarity, showing an alternate braided arrangement of flexible cords used to form the combined harness and leash device of FIG. 1, according to another embodiment of the present disclosure.
Figure 10:
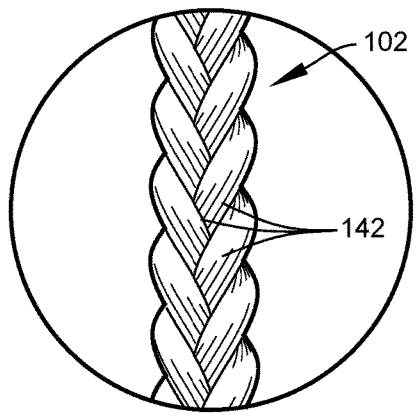
FIG. 10 is a detail view, enlarged for clarity, showing an alternate braided arrangement of flexible cords used to form the combined harness and leash device of FIG. 1, according to another embodiment of the present disclosure.
Figure 11:
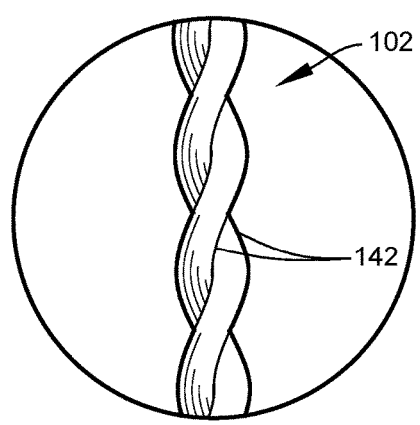
FIG. 11 is a detail view, enlarged for clarity, showing an alternate twist-braided arrangement of flexible cords used to form the combined harness and leash device of FIG. 1, according to another embodiment of the present disclosure.

FIG. 8 is a detail view, enlarged for clarity, illustrating a plurality of flexible cords 142 braided together to form the elongated flexible member 102, according to an embodiment of the present disclosure. FIG. 9 is detail view, enlarged for clarity, illustrating an alternate arrangement of four flexible cords 142 braided together to form the elongated flexible member 102, according to another embodiment of the present disclosure. FIG. 10 is a detail view, enlarged for clarity, illustrating an arrangement of three flexible cords 142 braided together to form the elongated flexible member 102, according to another embodiment of the present disclosure. FIG. 11 is a detail view, enlarged for clarity, illustrating two flexible cords 142 twisted together to form the elongated flexible member 102, according to another embodiment of the present disclosure. Thus, the elongated flexible member 102 may be formed from less than five flexible cords 142, as shown in FIG. 8 through FIG. 11, from less than four flexible cords 142, as shown in FIG. 10 and FIG. 11, and may consist of two cords "braided" together as a twisted pair, as shown in FIG. 11. Additionally, forming the member 102 from less than five or less than four flexible cords includes forming it by braiding the cords, in some versions. In addition, the grippable hand loop 144 may be formed by back-braiding the second end 106 to an adjacent segment of the leash portion 148 using one or more of the above-noted braided arrangements. Those with ordinary skill in the art will now appreciate that upon reading this specification and by their understanding the art of braiding and plaiting as described herein, various methods of interlacing multiple strands of flexible material will be understood by those knowledgeable in such art.

The elongated flexible member 102 may be constructed from at least one viscose material (i.e., a semi-synthetic fiber composed of regenerated cellulose). Alternately the elongated flexible member 102 may be constructed from at least one cotton material. Alternately, the elongated flexible member 102 may be constructed from at least one recycled fabric. Upon reading this specification, it should be appreciated that, under appropriate circumstances, considering such issues as user preferences, design preference, structural requirements, marketing preferences, cost, available materials, technological advances, etc., other material arrangements such as, for example, combinations of synthetic and natural fibers, etc., may be sufficient.

The selected material forming the elongated flexible member 102 may be supplied in a wide range of colors. Colors may be imparted to the fibers by dyeing, integral coloring, or by other methods well-known to those with ordinary skill in the art of fiber coloring, as described herein.

Figure 12:
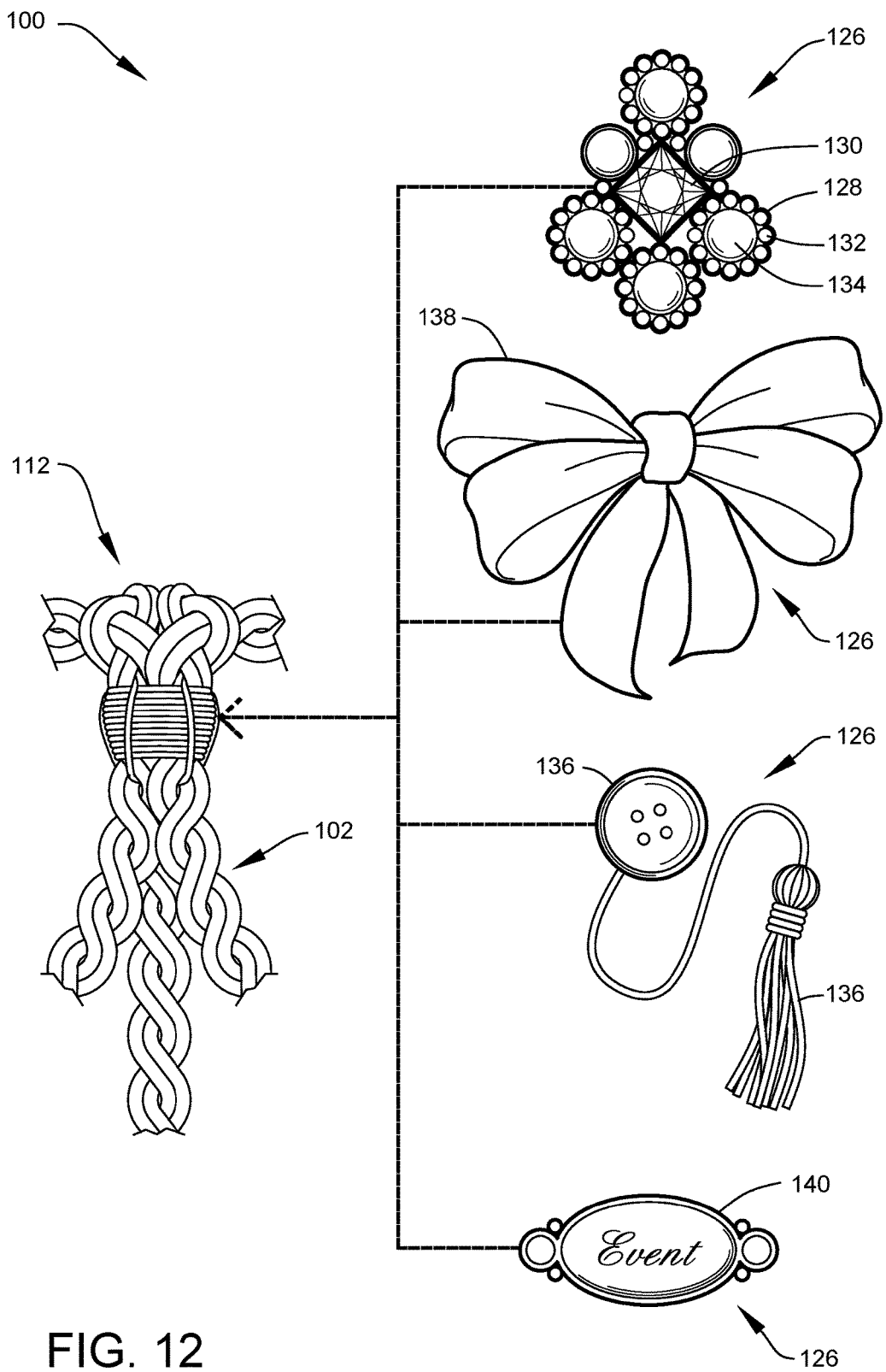
FIG. 12 is a diagrammatic depiction of various decorative elements, which may be selectively applied to the combined harness and leash device of FIG. 1, according to embodiments of the present disclosure.

FIG. 12 is a diagrammatic depiction of various decorative elements, which may be selectively applied to the combined harness and leash device of FIG. 1, according to various embodiments of the present disclosure. The decorative elements 126 applied to harness guide member 112 may include, but are not limited to, faux bijoux elements 128, crystals 130, beads 132, semi-precious stones 134, garment notions and findings 136, ribbons 138, indicia-containing items 140, or combinations of the aforementioned items. Jewelry elements may include vintage items or decorative items source from contemporary production sources. By way of example, these items may include, but are not limited to, commercially-produced garment decorations as well as "couture-quality" items produced by well-known fashion houses such as Louis Vuitton, Nina Ricci, Lanvin, Swarovski, etc. Upon reading this specification, it should be appreciated that, under appropriate circumstances, considering such issues as user preferences, design preference, marketing preferences, cost, available materials, technological advances, etc., other applied decorative arrangements such as, for example, silk flowers, hand-crafted pieces, embroidered elements, feathers, leatherwork, natural and synthetic furs, pearls, lacework, tassels, pom-poms, decorative buckles, plush toys, photographic images, illuminated elements, electronics, etc., may be sufficient.

The indicia-containing items 140 may include printing or engraving identifying, for example, the name of the pet, a place, an event, etc. The indicia-containing items 140 may be applied to the combined harness and leash device 100 as a useful promotional marketing item.

The decorative elements 126 may be applied to harness guide member 112 by sewing, tying, binding, pinning, clipping, gluing, or by other appropriate methods. Those with ordinary skill in the art will now appreciate that upon reading this specification and by their understanding the art of textile decoration as described herein, various methods of attachment will be understood by those knowledgeable in such art. Alternately, the decorative elements 126 may be applied to the harness guide member 112 using one or more releasable fasteners, thus allowing a user to selectively interchange decorative elements 126, as needed.

Referring again to FIG. 1, according to one embodiment, the combined harness and leash device 100 may be arranged as a kit 152. The kit 152 may include the combined harness and leash device 100 and may further include a set of instructions 155. The instructions 155 may detail functional relationships in relation to the structure of the combined harness and leash device 100 (such that the combined harness and leash device 100 can be used, maintained, or the like, in a preferred manner). Upon reading this specification, it should be appreciated that, under appropriate circumstances, considering such issues as user preferences, design preference, marketing preferences, cost, available materials, etc., other kit arrangements such as, for example, including a set of interchangeable decorative elements, including a storage bag, including media containing an instructional video or website link, including multiple devices in differing colors, etc., may be sufficient.

Figure 13:
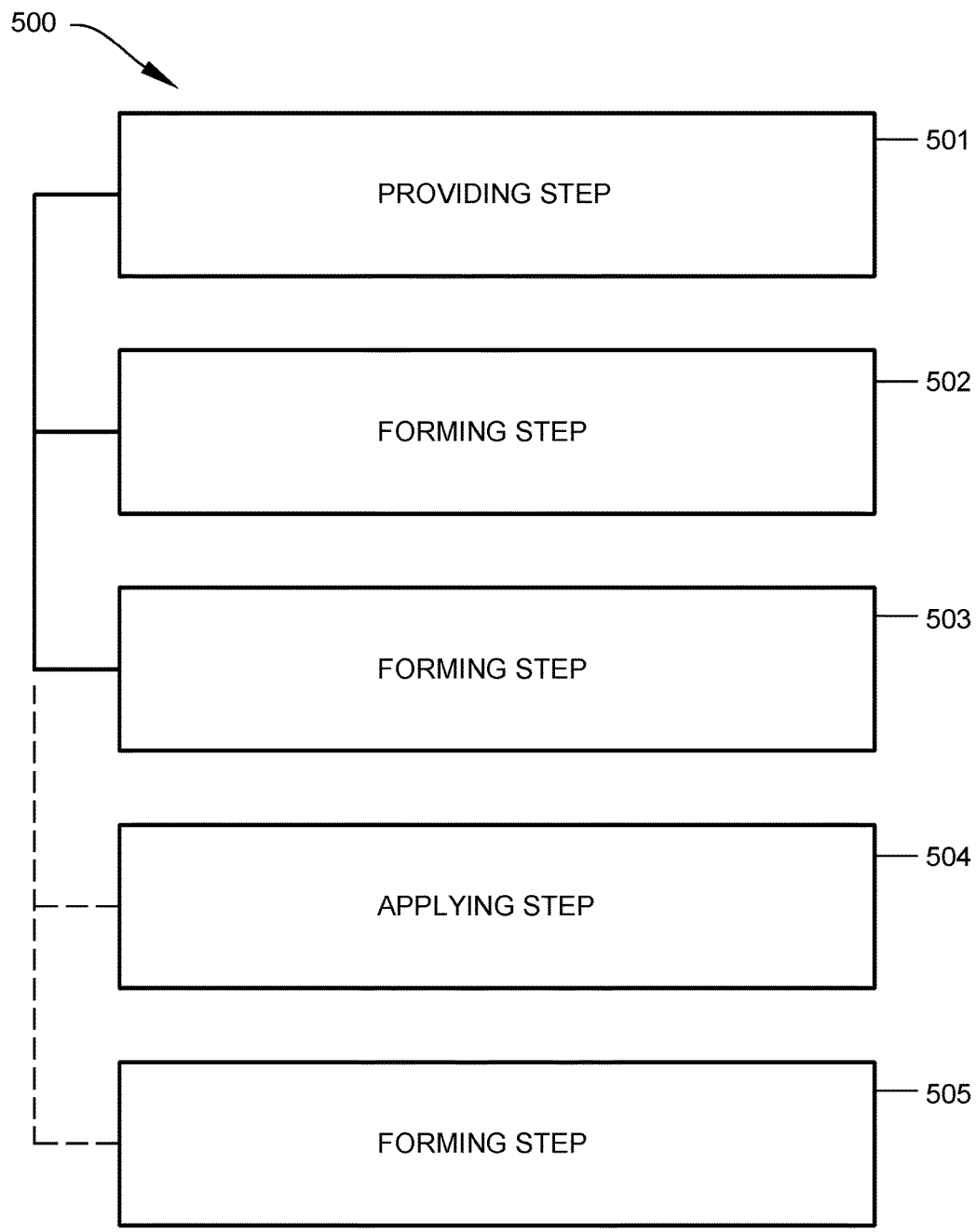
FIG. 13 is a flow diagram illustrating a method of constructing the combined harness and leash device, according to an embodiment of the present disclosure.

FIG. 13 is a flow diagram illustrating a method 500 for constructing, according to an embodiment of the present disclosure. In particular, the method 500 may include one or more components or features of the combined harness and leash device 100, as described above. As illustrated, the method 500 may include the steps of providing 501 an elongated flexible member having a first end, a second end, and an intermediate portion extending between the first end and the second end; forming 502 a harness portion within the intermediate portion, the harness portion including, a harness guide member adjoining the first end, the harness guide member having at least one guide aperture configured to slidably receive the elongated flexible member, the harness guide member configured to be positionable above a back portion of the pet during use; a first foreleg loop configured to adjustably encircle a first foreleg of the pet, the first foreleg loop including: a harness guide member adjoining the first end, the harness guide member having at least one guide aperture configured to slidably receive the elongated flexible member, the harness guide member configured to be positionable above a back portion of the pet during use; a first foreleg loop configured to adjustably encircle a first foreleg of the pet, the first foreleg loop including a fixed first-loop segment joined to the harness guide member, and a movable first-loop segment slidably passing through the at least one guide aperture of the harness guide member, and a second foreleg loop configured to adjustably encircle a second foreleg of the pet, the second foreleg loop including a fixed second-loop segment joined to the harness guide member, and a movable second-loop segment joined with movable first-loop segment slidably passing through the at least one guide aperture of the harness guide member; and step three 503, forming a leash portion within the intermediate portion, the leash portion joined with the harness guide member and extending outwardly to the second end.

In addition, the method 500 may further include the steps of applying 504 at least one decorative element to the harness guide member and forming 505 a grippable hand loop within the leash portion, the grippable hand loop configured to assist hand gripping of the leash portion.

It should be noted that steps 504 and 505 are optional steps and may not be implemented in all cases. Optional steps of the method 500 are illustrated using dotted lines in FIG. 13 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods of assembly [NOTE: e.g., different step orders within above-mentioned list, elimination or addition of certain steps, including or excluding certain maintenance steps, etc.], are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A combined harness and leash device for a pet comprising:
    an elongated flexible member having a first end, a second end, and an intermediate portion extending between the first end and the second end;
    a harness portion formed within the intermediate portion, the harness portion including
        adjoining the first end, a harness guide member having at least one guide aperture configured to slidably receive the elongated flexible member, the harness guide member configured to be positionable above a back portion of the pet during use;
        a first foreleg loop configured to adjustably encircle a first foreleg of the pet, the first foreleg loop including
            a fixed first-loop segment joined to the harness guide member, and
            a movable first-loop segment slidably passing through the at least one guide aperture of the harness guide member, and
        a second foreleg loop configured to adjustably encircle a second foreleg of the pet, the second foreleg loop including
            a fixed second-loop segment joined to the harness guide member, and
            a movable second-loop segment joined with movable first-loop segment slidably passing through the at least one guide aperture of the harness guide member; and
    a leash portion formed within the intermediate portion, the leash portion joined with the harness guide member and extending outwardly to the second end.

2. The combined harness and leash device of claim 1, wherein the first foreleg loop is configured to be selectively size adjustable by slidably extending and slidably retracting the movable first-loop segment through the guide aperture of the harness guide member.

3. The combined harness and leash device of claim 1, wherein the second foreleg loop is configured to be selectively size adjustable by slidably extending and slidably retracting the movable second-loop segment through the guide aperture of the harness guide member.

4. The combined harness and leash device of claim 1, wherein the first foreleg loop and the second foreleg loop are configured to be concurrently size adjustable by slidably extending and slidably retracting either one of the movable first-loop segment and the movable second-loop segment through the guide aperture of the harness guide member.

5. The combined harness and leash device of claim 1, wherein the harness guide member is configured to adjustably retain the elongated flexible member at a selected position by frictional engagement of the elongated flexible member with the at least one guide aperture.

6. The combined harness and leash device of claim 1, wherein the harness guide member is formed by knotting the elongated flexible member.

7. The combined harness and leash device of claim 1, wherein the harness guide member further includes at least one applied decorative element.

8. The combined harness and leash device of claim 1, wherein the at least one applied decorative element includes at least one of a faux bijoux element, a crystal, a bead, a semi-precious stone, a garment finding, a ribbon, an indicia-containing item.

9. The combined harness and leash device of claim 1, wherein the elongated flexible member comprises a plurality of braided flexible cords.

10. The combined harness and leash device of claim 1, wherein the elongated flexible member comprises less than five braided flexible cords.

11. The combined harness and leash device of claim 1, wherein the elongated flexible member comprises less than four braided flexible cords.

12. The combined harness and leash device of claim 1, wherein the elongated flexible member comprises at least one viscose material.

13. The combined harness and leash device of claim 1, wherein the elongated flexible member comprises at least one cotton material.

14. The combined harness and leash device of claim 1, wherein the elongated flexible member comprises at least one recycled fabric.

15. The combined harness and leash device of claim 1, wherein the second end includes a grippable hand loop configured to assist hand gripping of the leash portion.

16. The combined harness and leash device of claim 1, wherein the grippable hand loop is formed by back-braiding the second end to the leash portion.

17. A combined harness and leash device for a pet comprising:
    an elongated flexible member having a first end, a second end, and an intermediate portion extending between the first end and the second end;
    a harness portion formed within the intermediate portion, the harness portion including adjoining the first end, a harness guide member having at least one guide aperture configured to slidably receive the elongated flexible member, the harness guide member configured to be positionable above a back portion of the pet during use;

a first foreleg loop configured to adjustably encircle a first foreleg of the pet, the first foreleg loop including
 a fixed first-loop segment joined to the harness guide member, and
 a movable first-loop segment slidably passing through the at least one guide aperture of the harness guide member, and a second foreleg loop configured to adjustably encircle a second foreleg of the pet, the second foreleg loop including
 a fixed second-loop segment joined to the harness guide member, and
 a movable second-loop segment joined with movable first-loop segment slidably passing through the at least one guide aperture of the harness guide member;
and a leash portion formed within the intermediate portion, the leash portion joined with the harness guide member and extending outwardly to the second end, wherein the first foreleg loop is configured to be selectively size adjustable by slidably extending and slidably retracting the movable first-loop segment through the guide aperture of the harness guide member, wherein the second foreleg loop is configured to be selectively size adjustable by slidably extending and slidably retracting the movable second-loop segment through the guide aperture of the harness guide member, wherein the first foreleg loop and the second foreleg loop are configured to be concurrently size adjustable by slidably extending and slidably retracting either one of the movable first-loop segment and the movable second-loop segment through the guide aperture of the harness guide member, wherein the harness guide member is configured to adjustably retain the elongated flexible member at a selected position by frictional engagement of the elongated flexible member with the at least one guide aperture, wherein the harness guide member is formed by knotting the elongated flexible member, wherein the harness guide member further includes at least one applied decorative element, wherein the at least one applied decorative element includes at least one of a faux bijoux element, a crystal, a bead, a semi-precious stone, a garment finding, a ribbon, an indicia-containing item, wherein the elongated flexible member comprises a plurality of braided flexible cords, wherein the second end includes a grippable hand loop configured to assist hand gripping of the leash portion, and wherein the grippable hand loop is formed by back-braiding the second end to the leash portion.

18. The combined harness and leash device of claim 17, further comprising a set of instructions and wherein the combined harness and leash device is arranged as a kit.

19. A method of making a combined harness and leash device, the method comprising the steps of:

providing an elongated flexible member having a first end, a second end, and an intermediate portion extending between the first end and the second end;

forming a harness portion within the intermediate portion, the harness portion including
 adjoining the first end, a harness guide member having at least one guide aperture configured to slidably receive the elongated flexible member, the harness guide member configured to be positionable above a back portion of the pet during use;
 a first foreleg loop configured to adjustably encircle a first foreleg of the pet, the first foreleg loop including
  a fixed first-loop segment joined to the harness guide member, and
  a movable first-loop segment slidably passing through the at least one guide aperture of the harness guide member, and
 a second foreleg loop configured to adjustably encircle a second foreleg of the pet, the second foreleg loop including
  a fixed second-loop segment joined to the harness guide member, and
  a movable second-loop segment joined with movable first-loop segment slidably passing through the at least one guide aperture of the harness guide member; and forming a leash portion within the intermediate portion, the leash portion joined with the harness guide member and extending outwardly to the second end.

20. The method of claim 19, further comprising the steps of applying at least one decorative element to the harness guide member; and forming a grippable hand loop within the leash portion, the grippable hand loop configured to assist hand gripping of the leash portion.

* * * * *